United States Patent
Kirkpatrick

(10) Patent No.: US 11,451,526 B2
(45) Date of Patent: Sep. 20, 2022

(54) ENCRYPTED 1-BIT AUDIO DISTRIBUTION SYSTEM

(71) Applicant: Crestron Electronics Inc., Rockleigh, NJ (US)

(72) Inventor: Philip L. Kirkpatrick, Ridgewood, NJ (US)

(73) Assignee: Crestron Electronics Inc., Rockleigh, NJ (US)

( * ) Notice: Subject to any disclaimer, the term of this patent is extended or adjusted under 35 U.S.C. 154(b) by 333 days.

(21) Appl. No.: 16/846,169

(22) Filed: Apr. 10, 2020

(65) Prior Publication Data

US 2021/0320907 A1    Oct. 14, 2021

(51) Int. Cl.
*H04L 9/40* (2022.01)
*H04L 12/28* (2006.01)
*G06F 3/16* (2006.01)
*G10L 19/008* (2013.01)
*H04H 60/04* (2008.01)
*H04R 3/00* (2006.01)

(52) U.S. Cl.
CPC .......... *H04L 63/0485* (2013.01); *G06F 3/162* (2013.01); *G06F 3/165* (2013.01); *G10L 19/008* (2013.01); *H04H 60/04* (2013.01); *H04L 12/28* (2013.01); *H04R 3/00* (2013.01)

(58) Field of Classification Search
CPC ..... H04L 63/0485; H04L 12/28; G06F 3/162; G06F 3/165; G10L 19/008; H04H 60/04; H04R 3/00
See application file for complete search history.

(56) References Cited

U.S. PATENT DOCUMENTS

| | | | |
|---|---|---|---|
| 6,963,860 B1 * | 11/2005 | Tsutsui | G06Q 30/02 705/52 |
| 7,088,398 B1 * | 8/2006 | Wolf | H04L 1/206 348/478 |
| 7,233,948 B1 * | 6/2007 | Shamoon | H04N 21/8355 707/999.102 |
| 2012/0201383 A1 * | 8/2012 | Matsuo | H04L 63/06 380/255 |

OTHER PUBLICATIONS

Reefman, D. & Janssen, Erwin. (2004). One-bit Audio: An Overview. Journal of the Audio Engineering Society. Audio Engineering Society. 52.

* cited by examiner

*Primary Examiner* — Fan S Tsang
*Assistant Examiner* — David Siegel
(74) *Attorney, Agent, or Firm* — Crestron Electronics, Inc.

(57) ABSTRACT

An innovative system for transmitting encrypted 1-bit audio over an Ethernet network comprises using an omni-directional micro-electrical-mechanical system acoustic sensor element (11) to provide an analog input signal (33) to a sigma-delta modulator (12) which then creates a pulse density modulated 1-bit data stream (32), at an audio oversampling rate, to a first input of a first exclusive-or (XOR) logic gate (58). The second input of the XOR logic gate is simultaneously presented with a first pseudo-random 1-bit data stream (78), at the same audio oversampling rate, thereby resulting in an encrypted pulse density modulated (PDM) 1-bit data stream (73) at the output of the XOR logic gate. The encrypted PDM 1-bit data stream is clocked into a first-in first-out (FIFO) memory at the audio oversampling rate and is clocked out of the first FIFO memory as Ethernet PDM frame data packages (74) at a predetermined Ethernet PHY transfer rate.

17 Claims, 10 Drawing Sheets

ENCRYPTED 1-BIT AUDIO DISTRIBUTION SYSTEM

BACKGROUND OF THE INVENTION

Technical Field

The embodiments described herein relate generally to audio data transmission in teleconferencing settings, and more specifically to systems, methods, and modes for securely distributing, with minimal latency, one or more 1-bit encrypted digital audio signals over a network using Internet protocol (IP).

Background Art

As those of skill in the art can appreciate, there are at least two main methods for encoding analog audio into digital data for storage and transmission: pulse density modulation (PDM), and pulse code modulated (PCM). The latter, PCM, has been widely employed in such technologies as the music industry, and especially for use with compact disks (CDs). Typically, such audio data is encoded using sixteen bits of resolution at a sampling rate of either 44.1 kilohertz (kHz) or 48 kHz. Such high levels of resolution are important in applications such as music storage and playing as many people have come to expect and appreciate high-fidelity audio systems.

In recent years, there has been increased interest in, and products offered for teleconferencing. That is, many new teleconference systems are currently being offered that provide either or both audio and video interfaces, with the audio-video (AV) data transmissions occurring over the Internet in many cases, although in some settings, enterprise entities may decide to use local networks (LANs) alone, ostensibly to control security.

At the device level, a typical microphone such as one used on a personal computer or cell phone will use a combination of PDM and PCM technologies. PDM, as those of skill in the art can appreciate, uses a single bit (technically a single stream of bits) to represent a sampled analog audio input signal and PCM uses a stream of data words, each of which represents the instantaneous amplitude of the sampled analog audio input signal. Despite the inherent limitations of a one-bit representation, it is possible to achieve extremely high audio performance by sampling this audio at a very high rate, such as, for example, a 2.82 Megahertz (Mhz) rate, which is a 64× oversampling of the typical CD audio sampling rate of 44.1 kHz. These prior art microphones convert audio that is detected at an acoustic sensor element in an analog-to-digital converter (ADC) that internally includes both a sigma-delta ($\Sigma$-$\Delta$) modulator and a filter decimator/lowpass filter to sequentially covert the analog audio first to PDM format and then directly to PCM format. It is known that a PCM format signal consumes substantially less digital bandwidth than an equivalent PDM format signal.

FIG. 1 depicts method 200 for transmitting and receiving pulse code modulated audio data using an Internet protocol, wherein the method comprises, among other steps, accepting an analog audio input at a microphone, such as a micro-electro-mechanical system (MEMS) acoustic sensor element (step 202), transferring the audio data over a digital network (step 210), and sending a corresponding analog output to a loudspeaker (step 220).

Referring now to FIG. 2 and continuing to refer to FIG. 1, an IP PCM audio transmitter 1 is based on a MEMS acoustic sensor element 11, that, for example, can be fabricated from a silicon wafer in the same manner that integrated circuits (IC) are manufactured. The MEMS acoustic sensor element 11 functions as an acoustic transducer that converts sound pressure waves into an analog input signal 33 that is accepted (step 202) by a $\Sigma$-$\Delta$ modulator 12 that converts (step 204) the analog input signal 33 into a PDM 1-bit data stream 32 having an update rate that is determined by a first audio oversampling clock 41 having a frequency that is an integer multiple of the desired audio sampling rate. For example, given a desired audio sampling rate of 48 kHz and a sixty-four times (64×) oversampling rate (OSR), the first audio oversampling clock 41 would have an operational frequency of 3.072 MHz. Those skilled in the art will recognize that a second order sigma-delta modulator operating at a 3.072 MHZ oversampling rate will provide acceptable CD-quality audio equivalent to, or better than, a 16-bit resolution digital signal that is updated at an audio sampling rate of 48 kHz.

The PDM 1-bit data stream 32 is decimated (step 206) into a 16-bit PCM N-bit digital data stream 31, by decimator filter 13, at an audio sampling rate that is determined by an audio sampling rate clock 42 typically having a frequency of either 48 kHz or 44.1 kHz, as described above. The 16-bit PCM N-bit digital data stream 31 is packaged (step 208) into Ethernet PCM frame data 34 by loading a first-in first-out (FIFO) memory 14 at the audio sampling rate, for example 48 kHz, and unloading the FIFO memory 14 at an Ethernet physical layer (PHY) transfer rate that is determined by an Ethernet PHY transfer rate clock 43, typically having a frequency of 25 MHz. Those skilled in the art can appreciate that additional overhead data, such as a frame checksum, will be required and that such data is typically computed by a processor and memory 10 that is connected to the FIFO memory 14.

The Ethernet PCM frame data 34 is transmitted (step 210) from first Ethernet interface 16 as an Ethernet PCM transmission 35, containing one channel of PCM, onto a network, such as a 100BaseT Ethernet LAN at a rate of 100 million bits per second (Mbps), although those skilled in the art will recognize that forty-eight thousand samples at sixteen bits per sample will only account for 768 thousand bits per second or less than one percent (1%) of the available bandwidth.

Refer now to FIG. 3, which shows prior art IP PCN audio receiver 2, and continue to refer to FIG. 1. The Ethernet transmission containing one channel of PCM data is received (step 210) at second Ethernet interface 26, which then transfers the data contained within the transmission, in the form of Ethernet PCM frame data 34, to FIFO memory 24. The Ethernet PCM frame data 34 is reconstructed (step 212) into the 16-bit PCM N-bit digital data stream 31 by loading a FIFO memory 24 at an Ethernet PHY transfer rate that is determined by an Ethernet PHY transfer rate clock 44, for example having a frequency of 25 MHz, and unloading the FIFO memory 24 at an audio sampling rate that is determined by an audio sampling rate clock 45, for example having a frequency of 48 kHz. The 16-bit PCM N-bit digital data stream 31 is converted (step 218) into an analog output 36 by digital-to-analog converter (DAC) 27 and finally the analog output 36 is sent (step 220) to loudspeaker 21. Those skilled in the art can appreciate that additional overhead data, such as a frame checksum, will be required and that such data is typically computed by a processor and memory 20 that is connected to the FIFO memory 24.

Pulse Density Modulation

PDM, as those of skill in the art can appreciate, uses a single bit (technically a single stream of bits) to represent the analog audio signal wherein the number of bits within a specific time period (bit density) is directly correlated with the amplitude of the audio signal. PDM can be a cost-effective way of conveying audio digitally. PDM requires less wiring since it can be transmitted over a signal a pair of lines—one for a clock, and the second for the data. PDM operates at relatively high clock frequencies, such as 64× the desired audio sampling rate, known as OSR. These high clock frequencies are beneficial because there is immunity from interfering signals in the audio frequency band and despite the inherent limitations of a one-bit representation of an audio signal, it is possible to achieve extremely high audio performance with careful design.

Pulse Code Modulation

PCM is a well-known way of representing a varying analog signal as a sequence, or stream, of N-bit data words, where N represents a power of 2 and a higher value for N corresponds to a higher signal resolution. For example, a 3-bit PCM signal can represent eight discrete values. In addition, it is also known by those of skill in the art that such PCM formatted digital signals are produced by ADC operating at a fixed audio sampling rate.

The PCM output digital word can range from a few bits to many bits. For example, there exist ADCs with outputs ranging from 6-12 bits; the higher number of bits the greater the resolution and the less quantization error there is. However, as the number of bits in the ADC increases so does the complexity of the circuitry needed to convert an analog input signal into an "N" bit word. In addition, as the sampling frequency increases so does the complexity of the ADC circuit design, as higher frequency signals require different integrated circuit manufacturing technologies and layout techniques for the IC and circuit board the ADC will be used in. Thus, there are at least two bottlenecks to high speed high precision ADCs: high clocking frequencies, and greater resolution.

PCM encoded audio has the advantage of being easy to manipulate using digital signal processing operations such as filtering operations. Such filtering operations use discrete Fourier Transforms (DFTs) to convert an audio signal from a time domain sampling representation to frequency domain information. Other common audio processing functions such as mixing, equalization, and echo cancellation are also more readily executable using PCM encoded audio than for example PDM encoded audio.

Long Felt Need

For existing network audio distribution as described above, audio is typically sampled in PDM format by a MEMS acoustic sensor element, but immediately converted to PCM format at the IP PCM audio transmitter 1 and transmitted in PCM format over a network to PCM audio receiver 2. This has the disadvantage of introducing a sampling latency because of the PDM to PCM conversion and data bus frame scheduling. Even more latency would occur if it is required for the PCM formatted audio data to be encrypted and subsequently decrypted for network security purposes.

Since it is known that audio latency is undesirable for multi-microphone systems, such as conference rooms, there is a long felt need to provide systems, methods, and modes for securely distributing, with minimal latency, digital audio signals over a network using IP. In addition, there has developed a recent awareness that most digital signals should be encrypted due to security and privacy concerns.

The invention described below fulfills this long felt need by encrypting one or more 1-bit PDM formatted audio streams using a very low latency exclusive-or (XOR) logic gate encoding method which advantageously can also reduce PDM-PCM conversion latency to a single audio sampling frame.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for securely distributing, with minimal latency, one or more 1-bit encrypted digital audio signals over a network using IP that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Aspects of the embodiments seek to overcome or at least ameliorate one or more of several problems, including but not limited to distributing digitized audio in an encrypted manner with minimal latency over an LAN.

DISCLOSURE OF INVENTION

According to a first aspect of the embodiments. a method for transmitting encrypted audio data over an Ethernet connection is provided, the method comprising: (a) converting (step 304) an audio input signal (33) into a pulse density modulated 1-bit data stream (32) at a first predetermined audio oversampling rate; (b) producing (step 307) an encrypted pulse density modulated 1-bit data stream (73) by XORing the pulse density modulated 1-bit data stream with a first pseudo-random 1-bit data stream (78); (c) packaging (step 309) the encrypted pulse density modulated 1-bit data stream into Ethernet pulse density modulated frame data (74) by loading a first FIFO memory (54) at the first predetermined audio oversampling rate and unloading said first FIFO memory at a first predetermined Ethernet PHY transfer rate; (d) transmitting and receiving (step 310) said Ethernet frame data from a first Ethernet interface (16) to a second Ethernet Interface (26); (e) reconstructing (step 313) the encrypted pulse density modulated 1-bit data stream from the Ethernet frame data by loading a second FIFO memory (64) at a second predetermined Ethernet PHY transfer rate and unloading said second FIFO memory at a second predetermined audio oversampling rate; (f) recovering (step 315) the pulse density modulated 1-bit data stream by XORing the encrypted pulse density modulated 1-bit data stream with a second pseudo-random 1-bit data stream (79); (g) decimating (step 317) the pulse density modulated 1-bit data stream into a pulse coded modulated N-bit digital data stream (31) at a predetermined audio sampling rate; and (h) converting (step 318) the N-bit pulse code modulated digital data stream into an analog output signal (36); wherein (i) said first and second pseudo-random 1-bit data streams comprise identical bit sequences at a predetermined encoding rate; and (ii) the steps of producing and reconstructing the encrypted pulse density modulated 1-bit data stream by XORing are performed at said predetermined encoding rate.

According to the first aspect of the embodiments, the N-bit pulse code modulated digital data stream is a 16-bit pulse code modulated digital data stream.

According to the first aspect of the embodiments, the first and second predetermined audio oversampling rates are both a same integer multiple of the predetermined audio sampling rate.

According to the first aspect of the embodiments, the predetermined encoding rate is an integer multiple of the predetermined audio sampling rate.

According to the first aspect of the embodiments, said predetermined audio sampling rate is an integer multiple of the predetermined encoding rate.

According to the first aspect of the embodiments, the method further comprises: (a) transmitting and receiving a unique seed value (70) from the first Ethernet interface to the second Ethernet Interface; (b) computing said first pseudo-random 1-bit data stream based on this unique seed value; and (c) computing said second pseudo-random 1-bit data stream based on this unique seed value.

According to a second aspect of the embodiments, an internet protocol (IP) pulse density modulation (PDM) audio transmitter apparatus adapted to transmit an encrypted PDM 1-bit data stream over an Ethernet network is provided, said apparatus comprising: (a) an acoustic sensor element (11); (b) a sigma-delta modulator (12) adapted to convert an analog input signal (33) into a pulse density modulated 1-bit data stream (32) at a predetermined audio oversampling rate; (c) a processor and memory (50) adapted to compute and produce a first pseudo-random 1-bit data stream (78) at a predetermined encoding rate; (d) a first exclusive-or (XOR) logic gate (58) operatively connected to the pulse density modulated 1-bit data stream and the pseudo-random 1-bit data stream in such a manner as to produce an encrypted pulse density modulated 1-bit data stream (73) at the predetermined audio oversampling rate; (e) a first FIFO memory (54) configured to load the encrypted pulse density modulated 1-bit data stream at said predetermined audio oversampling rate and to unload Ethernet pulse density modulated frame data (74) at a predetermined Ethernet PHY transfer rate; and (f) an Ethernet interface (16) configured to accept the Ethernet frame data at the predetermined Ethernet PHY transfer rate and to transmit Ethernet data packets on a network.

According to the second aspect of the embodiments said acoustic sensor element is a micro-electrical-mechanical system acoustic sensor element.

According to the second aspect of the embodiments, said predetermined audio oversampling rate is an integer multiple of the predetermined encoding rate.

According to the second aspect of the embodiments, the processor and memory are further adapted to: (a) compute a frame checksum (FCS; 712); (b) compute a payload preamble (806); and (c) load each of said Ethernet frame checksum and payload preamble into the FIFO memory.

According to the second aspect of the embodiments, the payload preamble includes a time stamp.

According to the second aspect of the embodiments, the processor and memory are further adapted to: (a) store a predetermined FCS delay gap (710); (b) store a predetermined interframe gap (714); (c) store a predetermined Ethernet frame prefix (802); (d) store a predetermined IP/UDP prefix (804); and (e) load each of said FCS delay gap, interframe gap, Ethernet frame prefix, and IP/UDP prefix into the FIFO memory.

According to a third aspect of the embodiments, an internet protocol speaker apparatus (6) adapted to receive a 1-channel encrypted PDM 1-bit data stream over an Ethernet network is provided, said apparatus comprising: (a) a first Ethernet interface configured to receive Ethernet data packets on a network; (b) a second FIFO memory (64) configured to load the Ethernet data packets at a predetermined Ethernet PHY transfer rate and to unload an encrypted pulse density modulated 1-bit data stream (73) at a second predetermined audio oversampling rate; (c) a processor and memory (60) adapted to compute and produce a second pseudo-random 1-bit data stream (79) at a predetermined encoding rate; (d) a second XOR logic gate (68) operatively connected to the encrypted pulse density modulated 1-bit data stream and the pseudo-random 1-bit data stream in such a manner as to produce an unencrypted pulse density modulated 1-bit data stream (32) at said predetermined audio oversampling rate; (e) a decimator filter (13) adapted to convert the unencrypted pulse density modulated 1-bit data stream into a pulse code modulated N-bit digital data stream (31) at a predetermined audio sampling rate; (f) a digital to analog converter (27) adapted to convert the N-bit pulse code modulated digital data stream into an analog output signal (36) at said predetermined audio sampling rate; and (g) a loudspeaker (21) configured to receive the analog output signal.

According to the third aspect of the embodiments, (a) the N-bit pulse code modulated digital data stream is a 16-bit pulse code modulated digital data stream.

According to the third aspect of the embodiments, (a) said predetermined audio oversampling rate is an integer multiple of the predetermined encoding rate.

According to a fourth aspect of the embodiments, an internet protocol (IP) loudspeaker apparatus (9) adapted to receive a multi-channel encrypted PDM 1-bit data stream over an Ethernet network is provided, said apparatus comprising: (a) a second FIFO memory (64) configured to load Ethernet data packets at a predetermined Ethernet PHY transfer rate and to unload a plurality of encrypted pulse density modulated 1-bit data streams (83A-83G) at a predetermined audio oversampling rate; (c) a processor and memory (90) adapted to compute and produce a plurality of pseudo-random 1-bit data streams (89A-89G) at a predetermined encoding rate; (d) a plurality of XOR logic gates (98A-98G), each of said XOR gates operatively connected to a corresponding one of said plurality of encrypted pulse density modulated 1-bit data streams and a corresponding one of said plurality of pseudo-random 1-bit data streams in such a manner as to produce a corresponding plurality of unencrypted pulse density modulated 1-bit data streams (82A-82G) at said predetermined audio oversampling rate; (e) a plurality of decimator filters (93A-93G) adapted to convert each of said plurality of unencrypted pulse density modulated 1-bit data streams into a corresponding plurality of N-bit pulse code modulated digital data streams (81A-81G) at a predetermined audio sampling rate; (f) a digital audio mixer (99) configured to accept the plurality of N-bit pulse code modulated digital data streams and to produce a combined pulse code modulated N-bit digital data stream (31) multi-channel output; (g) a digital to analog converter

(27) adapted to convert the combined PCM N-bit digital data stream into an analog output signal (37) at said predetermined audio sampling rate; and (h) a loudspeaker (21) configured to receive the analog output signal.

According to the fourth aspect of the embodiments, the combined PCM N-bit data stream is a PCM 16-bit digital data stream.

BRIEF DESCRIPTION OF DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
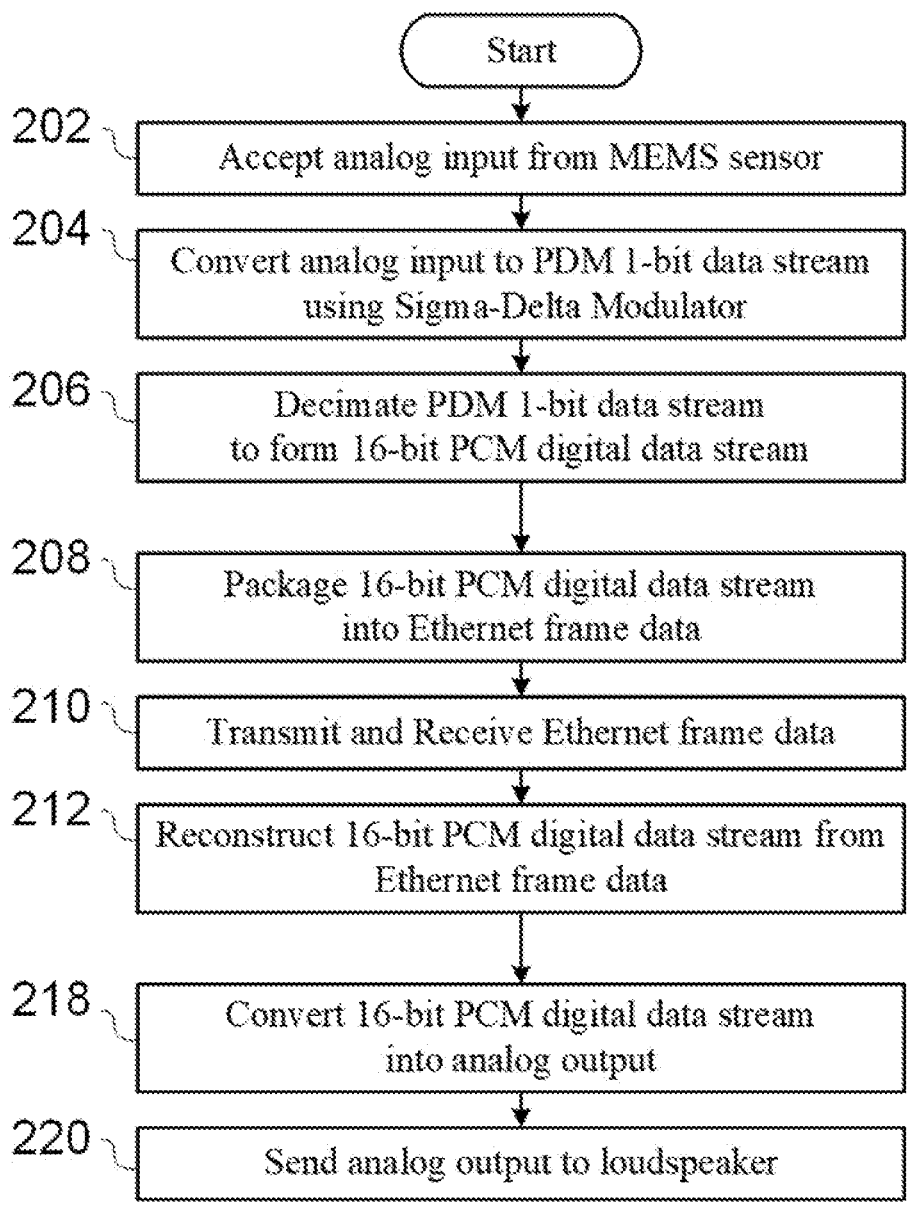

FIG. 1 illustrates a method, represented by sequential steps known in the in the prior art, for accepting an analog audio input from an acoustic sensor element, digitizing this audio into 1-bit pulse density modulation (PDM) format, decimating this PDM formatted audio into PCM format, and transmitting this PCM formatted audio via an Ethernet network in a non-encrypted state, and finally using this audio to drive a loudspeaker.

Figure 2:
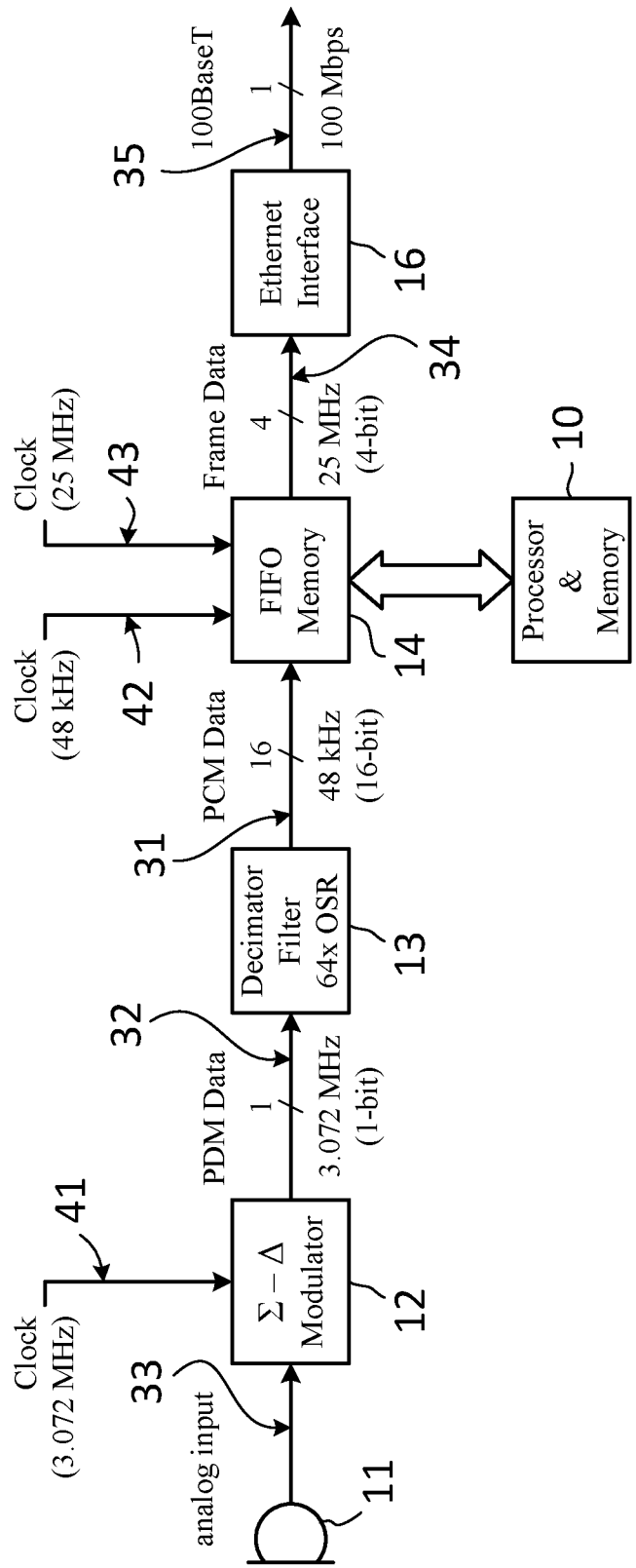

FIG. 2 is a block diagram of a non-encrypted audio transmitting apparatus, such as would be known in the prior art, that converts an input analog audio signal into a 1-bit PDM format having an OSR of 64×, where this signal is first decimated into a PCM format with 16-bit resolution and then transmitted via an Ethernet network.

Figure 3:
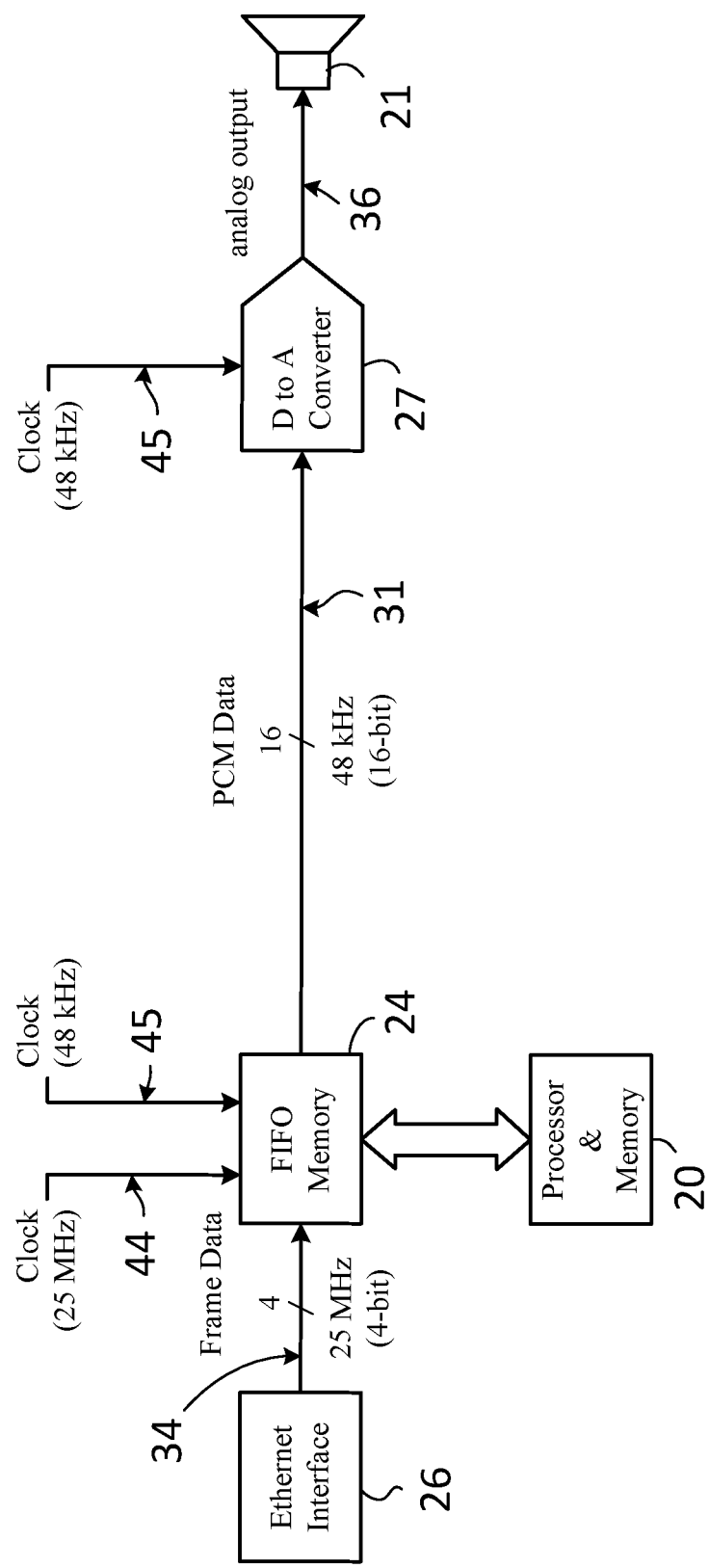

FIG. 3 is a block diagram of a non-encrypted audio receiving apparatus, such as would be known in the prior art, that receives audio data via an Ethernet network in a PCM format with 16-bit resolution and converts this data into an output analog audio signal which is used to drive a loudspeaker.

Figure 4:
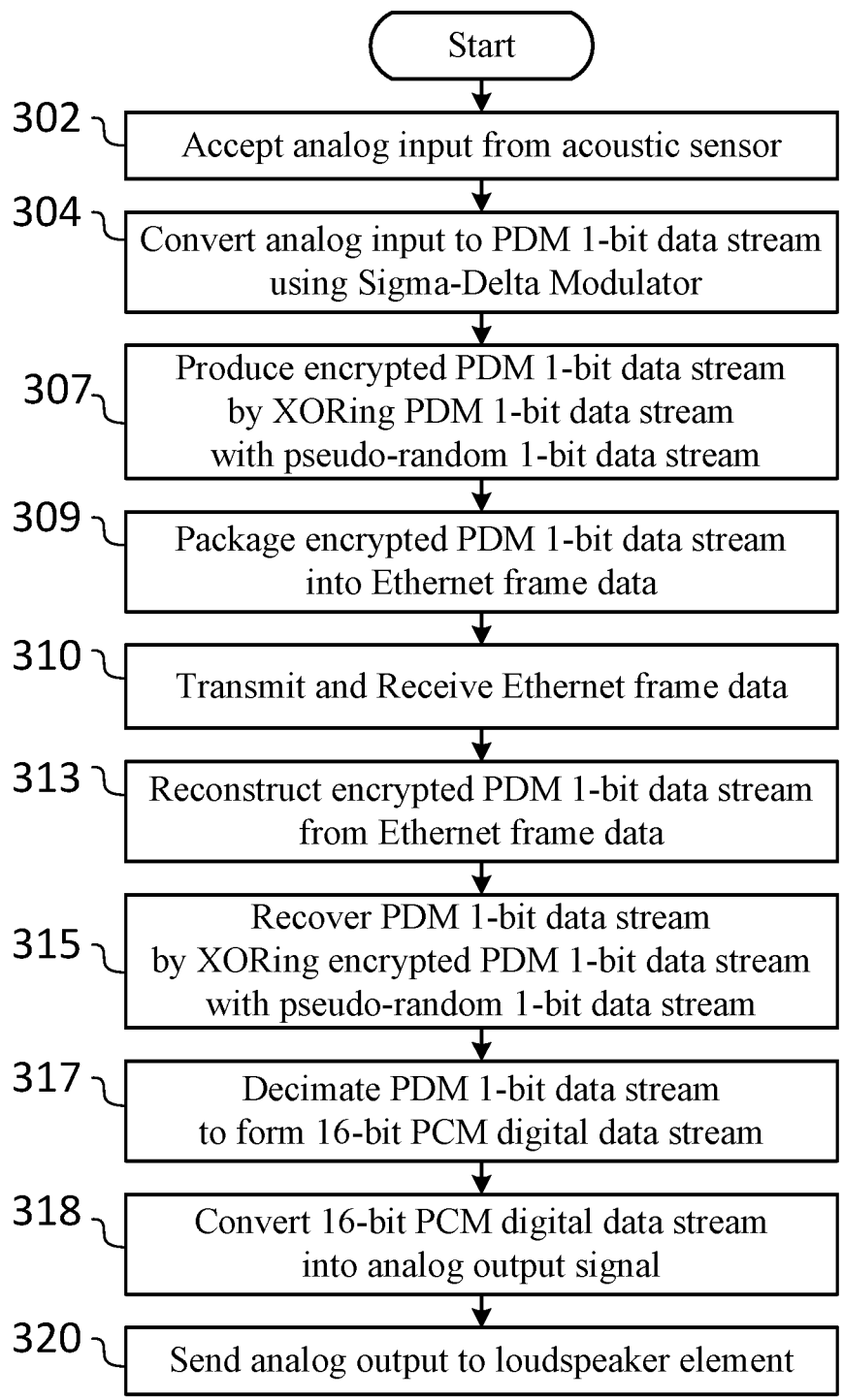

FIG. 4 illustrates an inventive method, whereby an input analog audio signal is digitized into 1-bit PDM format, encoded by an XOR operation into an encrypted 1-bit PDM data stream that is packaged and transmitted over a high speed Ethernet system by a first device, and then received, unencrypted, decimated into PCM format, and then converted into an analog signal that is input to a loudspeaker according to certain illustrative embodiments of the present invention.

Figure 5:
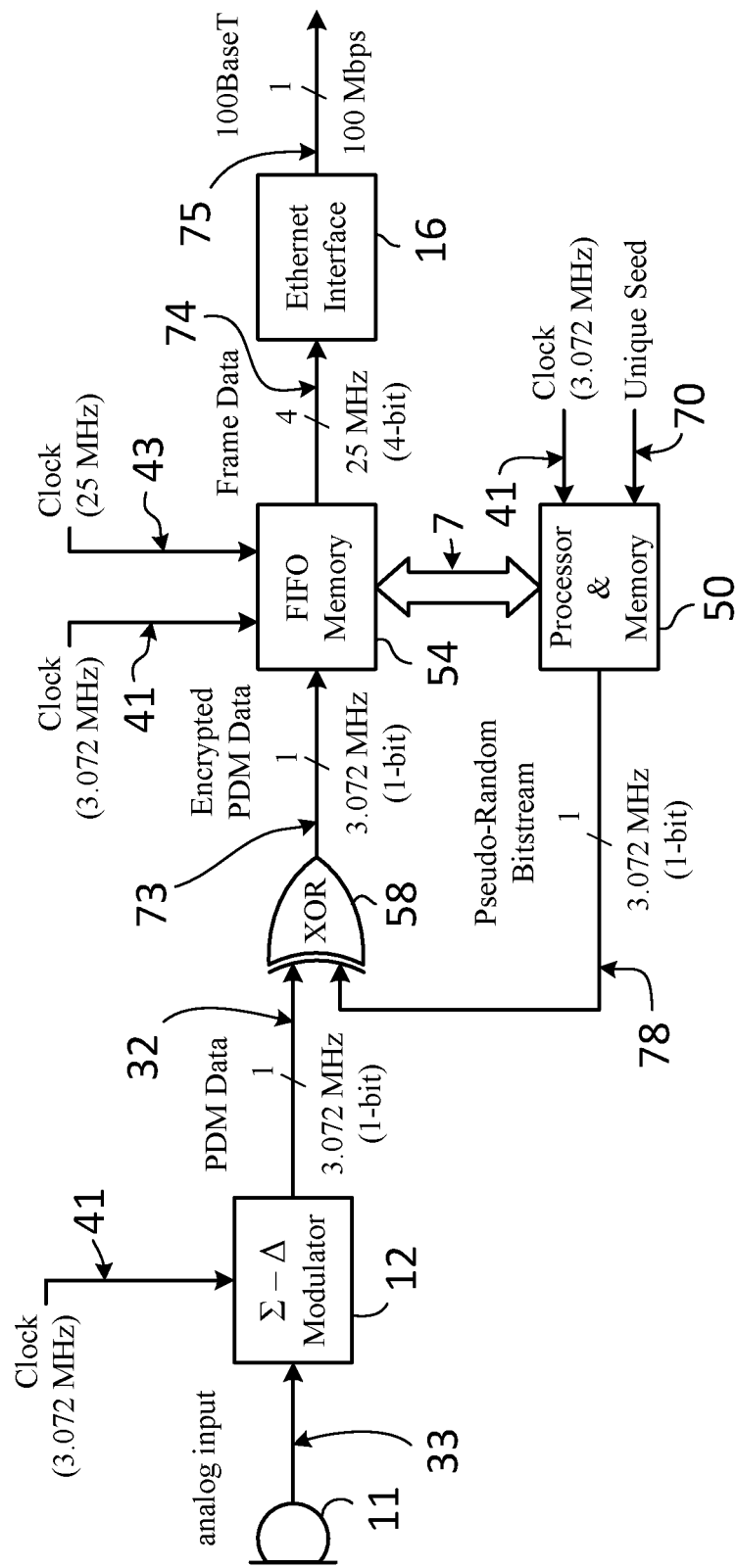

FIG. 5 is a block diagram of an encrypted 1-bit audio transmitting apparatus, according to an illustrative embodiment of the present invention.

Figure 6:
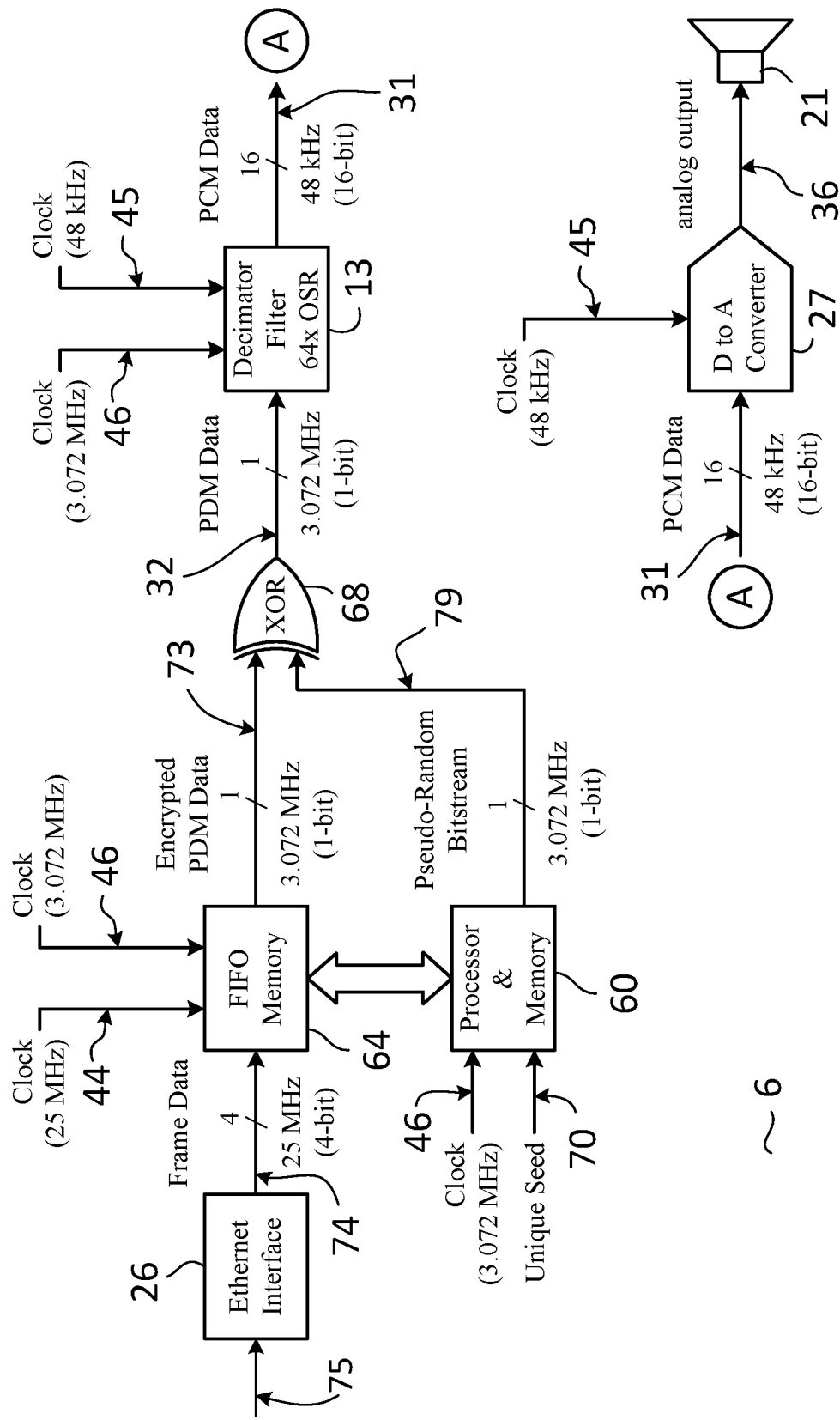

FIG. 6 is a block diagram of an encrypted 1-bit audio receiving apparatus, suitable for receiving 1-channel PDM data, according to a first illustrative embodiment of the present invention.

Figure 7A:
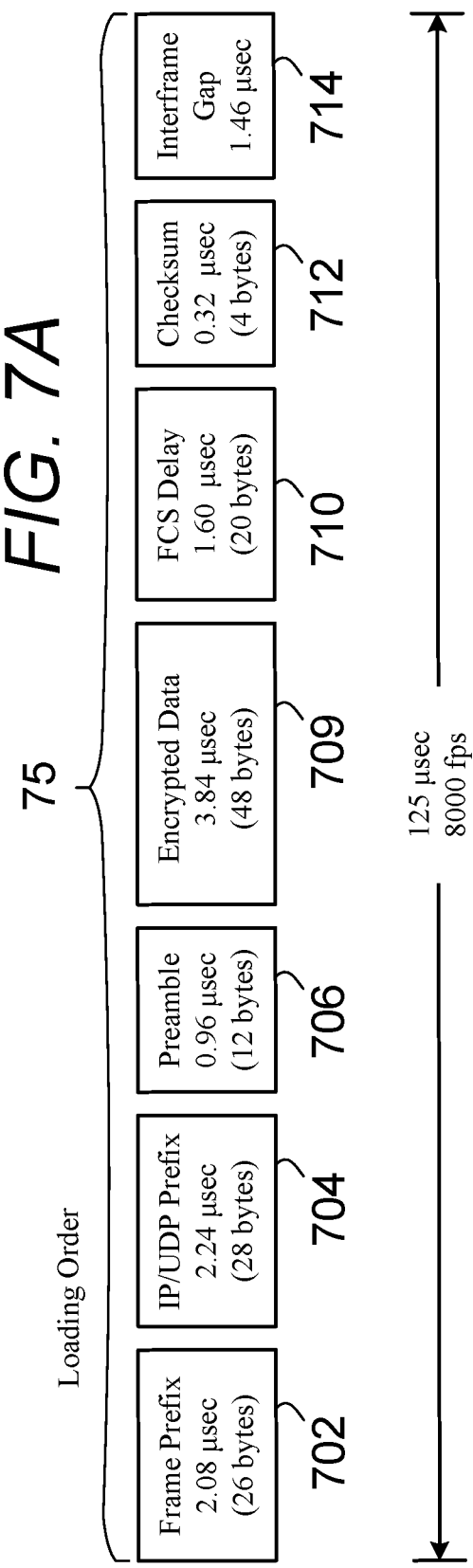
Figure 7B:
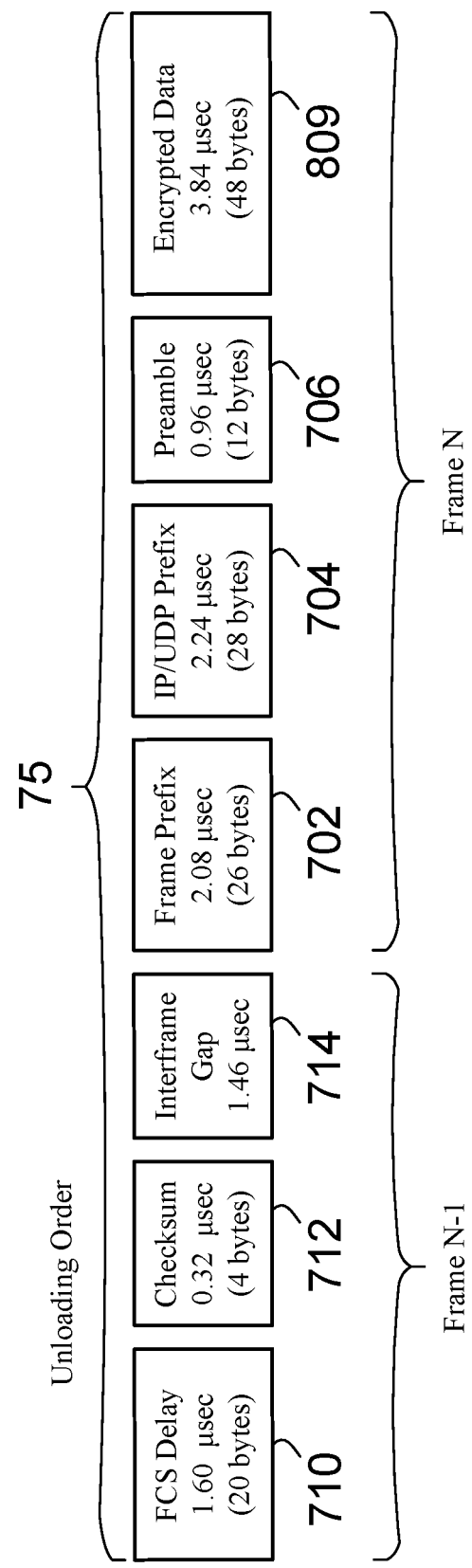

FIG. 7A illustrates a block diagram of a loading order of an Ethernet audio data frame that is transmitted from the apparatus of FIG. 5 over a network and received by the apparatus of FIG. 6 according to aspects of certain embodiments of the present invention, and FIG. 7B illustrates a block diagram of an unloading order of the Ethernet audio data frame that is transmitted from the apparatus of FIG. 5 over a network and received by the apparatus of FIG. 6 according to aspects of certain embodiments of the present invention.

Figure 8:
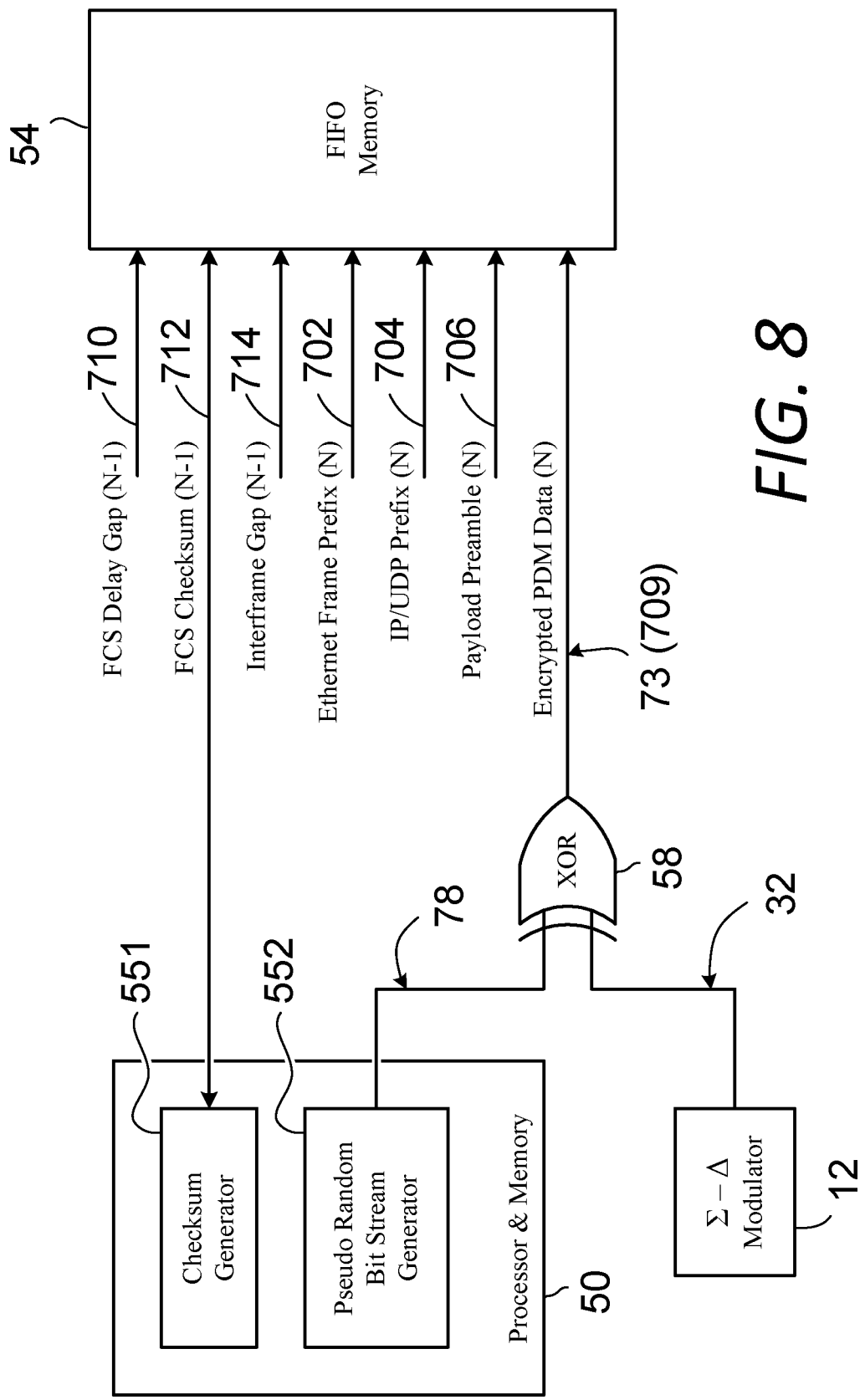

FIG. 8 illustrates details of a transferal of data between a processor and memory and FIFO memory of the apparatus of FIG. 5 according to aspects of certain embodiments of the present invention.

Figure 9:
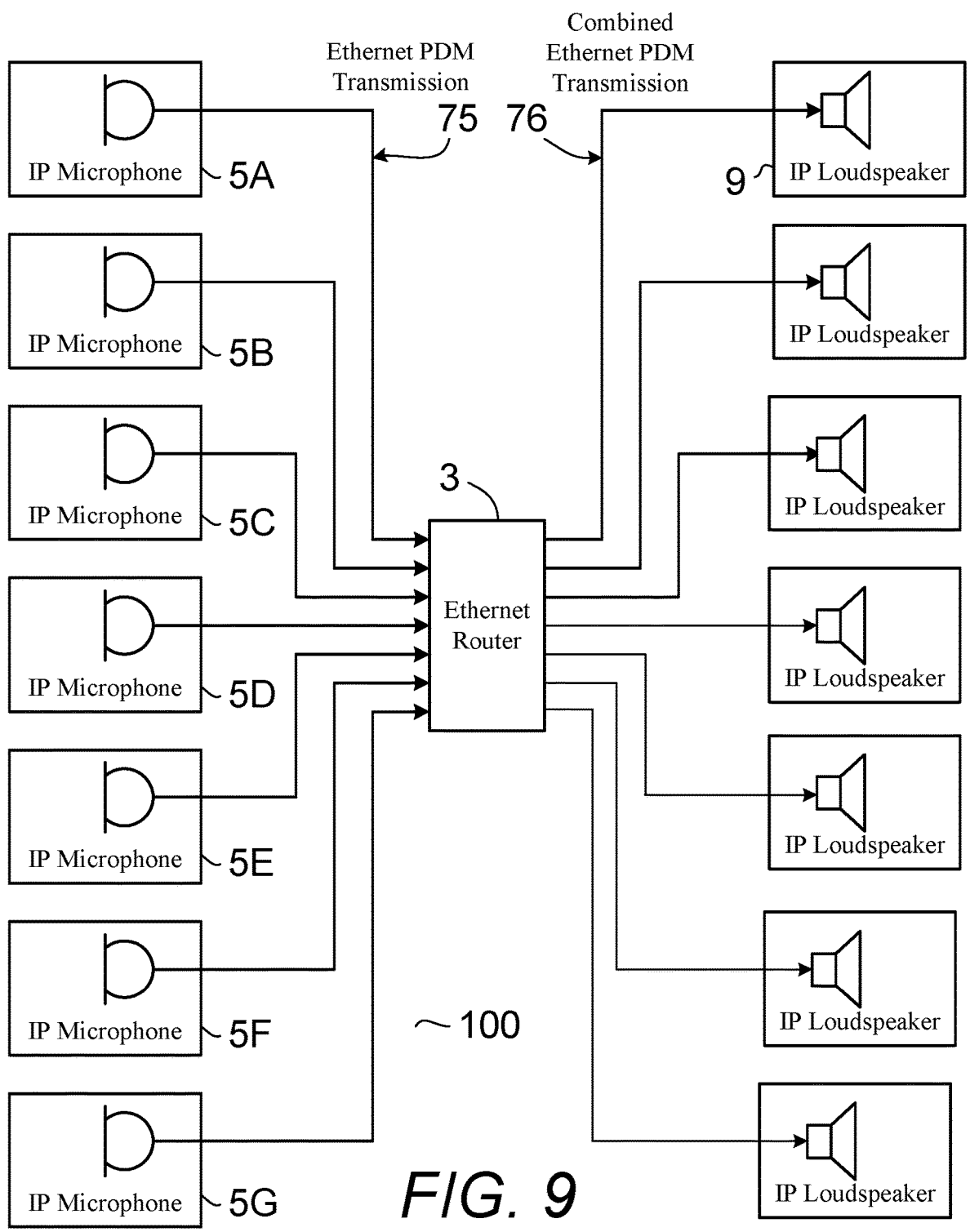

FIG. 9 depicts an encrypted 1-bit audio distribution system including a plurality of inventive transmitting and receiving apparatuses connected via an Ethernet network using a router.

Figure 10:
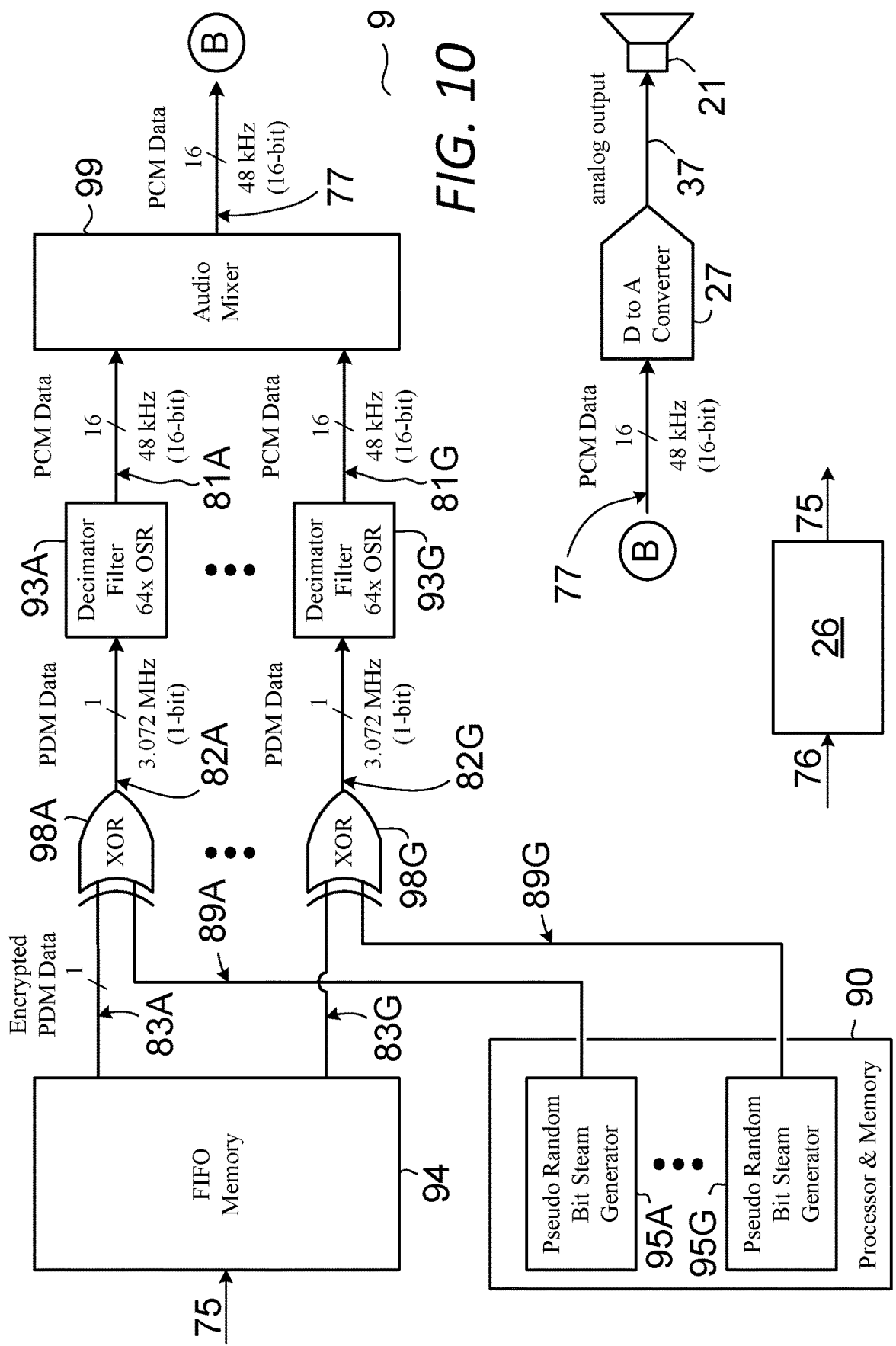

FIG. 10 is a block diagram of an encrypted 1-bit audio receiving apparatus, suitable for receiving multi-channel PDM data, according to a second illustrative embodiment of the present invention.

LIST OF REFERENCE NUMBERS FOR THE MAJOR ELEMENTS IN THE DRAWING

The following is a list of the major elements in the drawings in numerical order.

| | |
|---|---|
| 1 | IP PCM audio transmitter (prior art) |
| 2 | IP PCM audio receiver (prior art) |
| 3 | Ethernet router and processor |
| 5 | IP PDM audio transmitter (per present invention) |
| 5A-5G | plurality of IP PDM audio transmitters (IP audio transmitter 5) |
| 6 | IP PDM audio receiver (1-channel input) |
| 7 | data (transferred between processor and memory 50 and first FIFO memory 54) |
| 9 | IP PDM audio receiver (multi-channel input) |
| 10 | processor and memory (p/o IP PCM audio transmitter 1) |
| 11 | MEMS acoustic sensor element (p/o of IP PCM audio transmitter 1) |
| 12 | sigma-delta modulator (converts analog signal to PDM 1-bit data) |
| 13 | decimator filter (converts PDM 1-bit data to PCM N-bit data) |
| 14 | FIFO memory (packages PCM N-bit data into Ethernet packet) |
| 16 | first Ethernet interface (transmitter) |
| 20 | processor and memory (p/o IP PCM audio receiver 2) |
| 21 | loudspeaker (p/o 1-channel IP PCM audio receiver 2) |
| 24 | FIFO memory (unpackages Ethernet packet into PCM N-bit data) |
| 26 | second Ethernet interface (receiver) |
| 27 | digital to analog converter (converts PCM N-bit data into analog signal) |
| 31 | PCM N-bit digital data stream (representation of analog input signal 33) |
| 32 | PDM 1-bit data stream (representation of analog input signal 33) |
| 33 | analog input signal (from acoustic sensor element 11) |
| 34 | Ethernet PCM frame data (1-channel PCM data) |
| 35 | Ethernet PCM transmission (1-channel PCM data) |
| 36 | analog output signal (to loudspeaker 21) |
| 37 | combined analog output signal (multi-channel output) |
| 41 | first audio oversampling clock (frequency is integer multiple of audio sampling rate clock 42) |
| 42 | audio sampling rate clock |
| 43 | Ethernet PHY transmit transfer rate clock |
| 44 | Ethernet PHY receive transfer rate clock |
| 45 | audio sampling rate clock |
| 46 | second audio oversampling rate clock (same frequency as first audio oversampling rate clock 41) |
| 50 | processor and memory (p/o IP PDM audio transmitter 5) 54 first FIFO memory (packages encrypted PDM 1-bit data stream 73 into Ethernet packet) |
| 58 | first XOR logic gate (p/o IP PDM audio transmitter 5) |
| 60 | processor and memory (p/o IP PDM audio receiver 6) |
| 64 | second FIFO memory (unpackages 1-channel Ethernet packet into one encrypted PDM 1-bit data stream 72) |
| 68 | second XOR logic gate (p/o IP PDM audio receiver 6) |
| 70 | unique seed value (used to create pseudo-random bitstream) |
| 73 | encrypted PDM 1-bit data stream |

-continued

| | |
|---|---|
| 74 | Ethernet PDM frame data (1-channel encrypted PDM data) |
| 75 | Ethernet PDM transmission (1-channel encrypted PDM data) |
| 76 | Combined Ethernet PDM transmission (multi-channel encrypted PDM data) |
| 77 | combined PCM N-bit data stream (combined multi-channel output from digital audio mixer 99) |
| 78 | first pseudo-random 1-bit data stream (from processor and memory 50) |
| 79 | second pseudo-random 1-bit data stream (from processor and memory 60) |
| 81A-81G | plurality of PCM N-bit data streams (from plurality of decimator filters 93A-93G) |
| 82A-82G | plurality of unencrypted PDM 1-bit data streams (from plurality of XOR logic gates 98A-98G) |
| 83A-83G | plurality of encrypted PDM 1-bit data streams (from FIFO memory 94) |
| 89A-89G | plurality of pseudo-random 1-bit data streams (from processor and memory 90) |
| 90 | processor and memory (p/o multi-channel IP PDM audio receiver 9) |
| 93A-93G | plurality of decimator filters (p/o multi-channel IP PDM audio receiver 9) |
| 94 | FIFO memory (unpackages multi-channel Ethernet packet into a plurality of unencrypted PDM 1-bit data streams 82A-82G) |
| 95A-95G | plurality of pseudo random bit stream generators (p/o processor and memory 90) |
| 98A-98G | plurality of XOR logic gates (p/o multi-channel IP PDM audio receiver 9) |
| 99 | digital audio mixer (p/o multi-channel IP PDM audio receiver 9) |
| 100 | networked digital audio distribution system |
| 200 | Method for transmitting and receiving audio data encoded using pulse code modulation using an Internet protocol |
| 202-220 | Steps of Method 200 |
| 300 | Method for transmitting and receiving audio data encoded using pulse density modulation using an Internet protocol |
| 302-320 | Steps of Method 300 |
| 551 | checksum generator (p/o processor and memory 50) |
| 552 | pseudo-random bit stream generator (p/o processor and memory 50) |
| 702 | Ethernet frame prefix (frame N-1) |
| 704 | IP/UDP prefix (frame N-1) |
| 706 | payload preamble (frame N-1) |
| 709 | encrypted PDM data payload (frame N-1) |
| 710 | Frame Check Sum (FCS) delay gap (frame N-1) |
| 712 | FCS checksum (frame N-1) |
| 714 | interframe gap (frame N-1) |

DETAILED DESCRIPTION OF THE INVENTION

The detailed description that follows is written from the point of view of a control systems company, so it is to be understood that generally the concepts discussed herein are applicable to various subsystems and not limited to only a particular controlled device or class of devices, such as audio teleconferencing systems.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of systems, methods, and modes for securely distributing, with minimal latency, one or more 1-bit encrypted digital audio signals over a network using Internet Protocols (IP), but is not limited thereto, except as may be set forth expressly in the appended claims.

The description below of the aspects of the embodiments, is both non-exclusive and non-limiting. The description below of the aspects of the embodiments is non-exclusive in that additional terms can or have been used, and it is non-limiting in that other meanings as defined in the description below in view of the context of the aspects of the embodiments can be inferred therefrom. Thus, the following is meant as a non-limiting beginning guide to understanding the terms in view of the aspects of the embodiments Refer now to FIGS. 4 and 5. An Internet protocol (IP) PDM audio transmitter 5 includes a MEMS acoustic sensor element 11. The MEMS acoustic sensor element 11 functions as an acoustic transducer that converts sound pressure waves into an analog input signal 33 that is accepted (step 302) by $\Sigma$-$\Delta$ modulator 12 that converts (step 304) the analog input signal 33 into PDM 1-bit data stream 32 having an update rate that is determined by a first audio oversampling clock 41 which has a frequency that is an integer multiple of the desired audio sampling rate. For example, given a desired audio sampling rate of 48 kHz and a sixty-four times (64×) OSR, the first audio oversampling clock 41 would have an operational frequency of 3.072 MHz. Those skilled in the art will recognize that a second order sigma-delta modulator operating at a 3.072 MHZ oversampling rate will provide acceptable CD-quality audio equivalent to, or better than, a 16-bit resolution digital signal that is updated at an audio sampling rate of 48 kHz.

Next, an encrypted PDM 1-bit data stream 73 is produced (step 307) by an XOR logic gate operation, wherein the PDM 1-bit data stream 32 is applied to a first input of first XOR logic gate 58, and a first pseudo-random 1-bit data stream 78 is applied to a second input of first XOR logic gate 58. The first pseudo-random 1-bit data stream 78 may be created by processor and memory 50 based on a unique seed value 70 using various algorithms that are known in the art.

The encrypted PDM 1-bit data stream 73 is packaged (step 309) into Ethernet PDM frame data 74, containing 1-channel encrypted PDM data (encrypted PDM 1-bit data stream 73), by loading a first FIFO memory 54 at the first predetermined audio oversampling rate and unloading said first FIFO memory 54 at a transfer rate that is determined by Ethernet PHY transmit transfer rate clock 43.

The Ethernet PDM frame data 74 is transmitted (step 310) from a first Ethernet interface 16 as an Ethernet PDM transmission 75, containing 1-channel encrypted PDM data, onto a network, such as a 100BaseT Ethernet LAN at a rate of 100 Mbps.

Refer now to FIG. 6 and continue to refer to FIG. 4. The Ethernet PDM transmission 75, containing 1-channel encrypted PDM data is received (also step 310) at a second Ethernet Interface 26 which then transfers the data contained within the transmission, in the form of Ethernet PDM frame data 74, to second FIFO memory 64.

The Ethernet PDM frame data 74 is reconstructed (step 313) into the encrypted PDM 1-bit data stream 73 by loading the second FIFO memory 64 at a second predetermined Ethernet PHY transfer rate that is determined by a second Ethernet PHY transfer rate clock 44, typically having a frequency of 25 MHz, and unloading said second FIFO memory 64 at a second predetermined audio oversampling rate, determined by a second audio oversampling rate clock 46, which has a frequency matching that of the first audio oversampling rate clock 41, shown in FIG. 5.

In method step 315, the PDM 1-bit data stream 32 is recovered by XORing, at second XOR logic gate 68, the encrypted PDM 1-bit data stream 73 with a second pseudo-random 1-bit data stream 79. A person skilled in the art can appreciate that, when the first pseudo-random 1-bit data stream 78, shown in FIG. 5, and the second pseudo-random 1-bit data stream 79 contain an identical bit sequences, the XORing function of the second XOR logic gate 68 will act to unencrypt data that has been encrypted due to the XORing function of the first XOR logic gate 58, which is also shown in FIG. 5. It is important to note that the steps of producing (step 307) and reconstructing (step 313) the encrypted pulse density modulated 1-bit data stream by XORing are performed at the same predetermined encoding rate.

In method step 317, the PDM 1-bit data stream 32 is decimated into PCM N-bit digital data stream 31 at decimator filter 13 using a predetermined audio sampling rate that is determined by audio sampling rate clock 45.

In method step 318, PCM N-bit digital data stream 31 is converted into an analog output signal 36 by DAC 27. Finally, the analog output signal 36 is sent (step 320) to loudspeaker 21.

The encrypted PDM 1-bit data stream 73 is produced (step 307) by an XOR logic operation by combining the PDM 1-bit data stream 32 with first pseudo-random 1-bit data stream 78. In recovering (step 315) the PDM 1-bit data stream 32 is produced at the output of the second XOR logic gate 68 from the encrypted PDM 1-bit data stream 73 by using second pseudo-random 1-bit data stream 79. According to aspects of the embodiments, the same pseudo random bit stream generation algorithm used by processor and memory 50 is also used by processor and memory 60 to generate identical bit streams from the same unique seed value 70.

In decimating (step 317) the pulse density modulated 1-bit data stream is decimated into a PCM N-bit digital data stream 31 by decimator filter 13 at a predetermined audio sampling rate, using audio sampling rate clock 45, for example.

In converting (step 318) the N-bit pulse code modulated digital data stream is converted into an analog output signal 36 by DAC 27, wherein the audio sampling rate is determined by an audio sampling rate clock 45 typically having a frequency of either 48 kHz or 44.1 kHz, as described above.

Refer now to FIG. 7 and continue to refer to FIG. 5. Ethernet PDM transmission 75 comprises a series of Ethernet sub-frames, the sum of which comprises Ethernet PDM frame data 75, where each Ethernet sub-frame is a data link layer protocol data unit that uses the underlying Ethernet physical layer transport mechanisms. In other words, Ethernet PDM frame transmission 75 transports Ethernet sub-frames including data payloads and more specifically 1-channel encrypted PDM data. That is, the Ethernet PDM transmission 75 is loaded in the order shown in FIG. 7A and unloaded in the order shown in FIG. 7B. The loading order of FIG. 7A represents the order in which each Ethernet PDM transmission is built at first FIFO memory 54, and the unloading order represents the order in which the data within the Ethernet PDM transmission 75 is unloaded.

In the loading order shown in FIG. 7A, the Ethernet frame comprises Ethernet frame prefix 702 that has a predetermined fixed value, Internet Protocol (IP)/User Defined Protocol (UDP) prefix 704 that also has a predetermined fixed value, payload preamble 706 that preferably includes a time stamp, encrypted PDM data payload 709 which corresponds to encrypted PDM 1-bit data stream 73, frame check sum (FCS) delay gap 710 which comprises padding bits and allows for a time delay during which a frame check sequence (FCS)—checksum per Institute of Electrical and Electronics Engineers (IEEE) 802.3 is calculated, FCS checksum 712, and interframe gap 714 that preferably includes a synchronization delay to ensure that audio sampling rate is synchronized with Ethernet frame transmission rate. In a first embodiment of the present invention, 96000 Ethernet frames per second (fps) are transmitted and each Ethernet frame includes an encrypted PDM data payload 709 having 4 bytes (32 bits) of data. These 4 bytes of data represent one channel of audio, such as that produced by IP PDM audio transmitter 5.

It can be appreciated by those skilled in the art that up to eight channels of audio data, consisting of 32 bytes (256 bits; i.e., eight channels of Ethernet PDM frame data 74), can be contained in encrypted PDM data payload 709 within the overall timing constraint of 10.4 μsec that is determined by maintaining an Ethernet frame rate of 96,000 fps rate on a 100BaseT Ethernet network.

Attention is now directed to FIG. 7A, which shows an unloading of Ethernet PDM transmission 75. order As shown in FIG. 7A, the Ethernet PDM transmission 75 is sequentially unloaded from first FIFO memory 54—In order to minimize data latency, the encrypted PDM 1-bit data stream 73 is loaded over each entire Ethernet frame time period, for example 10.4 μsec, but it is unloaded at just the end of that time period so that the final bit of the 32 bits per Ethernet frame, of the encrypted PDM 1-bit data stream 73 is loaded into first FIFO Memory 54 just before it is unloaded. In other words, the loading of the audio data is spread out over the time period and unloading of the audio data is done in a burst.

Attention is now directed to FIG. 8. Simultaneous with the loading of a first portion of encrypted 1-bit data stream 73 for a current frame (Frame N), processor and memory 50 calculate the FCS Checksum 712 for the proceeding frame (Frame N–1), using, for example, checksum generator 551. More specifically, encrypted PDM data 73, for Frame N (generated by inputting an output of pseudo random bit stream generator 552 and sigma-delta generator 12 into XOR logical gate 58), is loaded simultaneously with the FCS delay gap 710, the FCS checksum 712, and the interframe gap 714, all corresponding to Frame N–1 and then continuing with the Ethernet frame prefix 702, IP/UDP prefix 704, payload preamble 706, all corresponding to Frame N.

The Ethernet PDM transmission 75 is unloaded from first FIFO memory 54 during each Ethernet frame such that the FCS delay gap, which may consist of padding zero '0' bits, commences unloading immediately at the beginning of each Ethernet unloading frame.

Refer now to FIG. 9 which shows a networked digital audio distribution system 100 in accordance with one illustrative embodiment of the present invention. There are a plurality, such as seven, IP PDM audio transmitters 5A-5G, each of which produce an Ethernet PDM transmission 75 including 1-channel of encrypted PDM data, as described above for FIGS. 5 and 7. Accordingly, each of the IP PDM audio transmitters 5A-5G output a sequence of Ethernet PDM transmissions 75, as described above in FIG. 7, among other Figures, and each of the Ethernet PDM transmissions 75 includes an encrypted PDM data payload 709 portion that consists of a single channel of audio data corresponding to the particular output of a single one of the IP PDM audio transmitters 5A-5G (i.e., one Ethernet PDM transmission 75 for each of the IP PDM audio transmitters 5A-5G).

Ethernet router and processor 3 accepts a plurality, such as seven, of sets of sequential Ethernet frames, each corresponding to one of the plurality of IP PDM audio transmitters 5A-5G. The Ethernet router and processor 3 extracts the individual Ethernet PDM frame data 74, consisting of 4 bytes of data, from each one of the plurality of IP PDM audio transmitters 5A-5G, and forms a combined encrypted data portion, encrypted PDM data payload 709, consisting of 28 bytes of data corresponding to seven audio channels with 4 bytes per channel. After producing this combined encrypted data portion (encrypted PDM data payload 709), Ethernet router and processor 3 outputs the combined encrypted data portion as combined Ethernet PDM transmission 76 including multi-channel encrypted PDM data sequences to each of a plurality of IP PDM audio receivers, including for example IP PDM audio receiver 9, which can accept a multi-channel input.

Refer now to FIG. 10 and continue to refer to FIG. 9. The combined Ethernet PDM transmission 76, containing multi-channel encrypted PDM data, is received at Ethernet interface 26, which then transfers the data contained within the transmission, in the form of Ethernet PDM transmission 75, to FIFO memory 94. The Ethernet PDM transmission 75 is reconstructed into a plurality of encrypted PDM 1-bit data streams 83A-83G by unloading FIFO memory 94 in a manner similar to the that described for the unloading of second FIFO memory 64 in the description for FIG. 6 given above.

A plurality of unencrypted PDM 1-bit data streams 82A-82G are recovered from the corresponding plurality of encrypted PDM 1-bit data streams 83A-83G using a plurality of XOR logic gates 98A-98G and a plurality of pseudo-random 1-bit data streams 89A-89G in a manner similar to that described for the XORing function of second XOR logic gate 68 in the description for FIG. 6 given above. In one illustrative embodiment of the present invention, the plurality of pseudo-random 1-bit data streams 89A-89G are produced by a corresponding plurality of pseudo random bit stream generators 95A-95G, each being a functional component within processor and memory 90.

Each of the plurality of unencrypted PDM 1-bit data streams 82A-82G is decimated into a corresponding plurality of PCM N-bit data streams 81A-81G using a plurality of decimator filters 93A-93G in a manner similar to that described for decimator filter 13 in the description for FIG. 6 given above.

Each of the plurality of PCM N-bit data streams 81A-81G is accepted as an input to digital audio mixer 99 where they are combined using algorithms known in the art including, for example, such functions as adjusting individual volume levels, bass/treble, and phase shift. Digital audio mixer 99 outputs a combined PCM N-bit digital data stream 77 that has been created from the outputs from each of the plurality of IP PDM audio transmitters 5A-5G, shown in FIG. 9.

The combined PCM N-bit digital data stream 77 is converted into a combined analog output signal 37 using DAC 27 in a manner similar to that described for DAC 27 in the description for FIG. 6 given above. Finally, the combined analog output signal 37 is sent to loudspeaker 21.

The disclosed embodiments provide systems, methods, and modes for securely distributing, with minimal latency, one or more 1-bit encrypted digital audio signals over a network using IP or other user defined protocols. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Industrial Applicability

To solve the aforementioned problems, the aspects of the embodiments are directed towards systems, methods, and modes for securely distributing, with minimal latency, one or more 1-bit encrypted digital audio signals over a network using Internet Protocols.

List of Acronyms Used in the Specification in Alphabetical Order

The following is a list of the acronyms used in the specification in alphabetical order.

| | |
|---|---|
| Σ-Δ | sigma-delta (analog to PDM modulator) |
| ADC | analog-to-digital converter |
| AV | audio-video |
| CD | compact disc |
| DAC | digital-to-analog converter |
| DFT | Discrete Fourier Transform |
| FIFO | first-in, first-out memory |
| FCS | frame check sum |
| IEEE | Institute of Electrical and Electronics Engineers |
| IC | Integrated Circuit |
| IP | Internet protocol |
| kHz | kilohertz |
| LAN | local area network |
| Mbps | megabits per second |
| MEMS | micro-electro-mechanical system |
| MHz | megahertz |
| N | an integer having a predefined value |
| N − 1 | an integer having a predefined value that is one less than N |
| N + 1 | an integer having a predefined value that is one greater than N |
| N-bit | a predefined number of bits (such as 8, 12, 16, or 24) |
| OSR | oversampling rate |
| PCM | pulse code modulated |
| PDM | pulse density modulation |
| PHY | Ethernet physical layer (transmission path) |
| UDP | user defined protocol |
| XOR | exclusive-or (logic gate) |

Glossary of Terms Used in the Specification in Alphabetical Order

The following is a non-limiting, glossary of terms used in this description of the aspects of the embodiments.

| | |
|---|---|
| 100BaseT | Ethernet standard for 100 Mbps data transmission over unshielded twisted pair wiring |
| dither | a noise-like signal added before quantization to improve performance |
| IEEE 802.3 | A working group and a collection of IEEE standards produced by that working group defining the physical layer and data link layer's media access control of wired Ethernet |
| linearization | the process of mitigating the deleterious effects of data quantization, usually by adding dither |
| noise modulation | the undesirable variation of the noise floor in a system due to the signal content |
| sampling rate | the rate at which a signal is sampled to produce a discrete-time representation |
| word length | the number of bits used to represent a digital sample |
| quantization | a procedure for representing an arbitrary data sample using a given word length. |

Alternate Embodiments

Alternate embodiments may be devised without departing from the spirit or the scope of the different aspects of the embodiments. For example, an unencrypted 1-bit PDM stream from a microphone unit could be transmitted within Ethernet data packets to an encrypting unit which produces an encrypted 1-bit PDM stream as described above. Alternatively, additional audio processing could be performed within the inventive IP PDM audio receivers, such as for example echo cancellation.

What is claimed is:

1. A method for transmitting encrypted audio data over an Ethernet connection, said method comprising the steps of:
    (a) converting an audio input signal into a first pulse density modulated (PDM) 1-bit data stream at a first predetermined audio oversampling rate;
    (b) producing an encrypted PDM 1-bit data stream by exclusive-or-ing (XORing) the pulse density modulated 1-bit data stream with a first pseudo-random 1-bit data stream;
    (c) packaging the encrypted PDM 1-bit data stream into Ethernet PDM frame data by loading a first first-in first-out (FIFO) memory at the first predetermined audio oversampling rate and unloading said first FIFO memory at a first predetermined Ethernet physical layer (PHY) transfer rate;
    (d) transmitting and receiving said Ethernet PDM frame data from a first Ethernet interface to a second Ethernet Interface;
    (e) reconstructing the encrypted PDM 1-bit data stream from the Ethernet PDM frame data by loading a second FIFO memory at a second predetermined Ethernet PHY transfer rate and unloading said second FIFO memory at a second predetermined audio oversampling rate;
    (f) recovering the first PDM 1-bit data stream by XORing the encrypted pulse density modulated 1-bit data stream with a second pseudo-random 1-bit data stream;
    (g) decimating the first PDM 1-bit data stream into a pulse coded modulated (PCM) N-bit digital data stream at a predetermined audio sampling rate; and
    (h) converting the N-bit PCM digital data stream into an analog output signal; wherein
    (i) said first and second pseudo-random 1-bit data streams comprise identical bit sequences at a predetermined encoding rate; and
    (j) the steps of producing and reconstructing the encrypted PDM 1-bit data stream by XORing are performed at said predetermined encoding rate.

2. The method of claim 1, wherein:
    (a) the N-bit PCM digital data stream is a 16-bit pulse code modulated digital data stream.

3. The method of claim 1, wherein:
    (a) said first and second predetermined audio oversampling rates are both a same integer multiple of the predetermined audio sampling rate.

4. The method of claim 1, wherein:
    (a) said predetermined encoding rate is an integer multiple of the predetermined audio sampling rate.

5. The method of claim 1, wherein:
    (a) said predetermined audio sampling rate is an integer multiple of the predetermined encoding rate.

6. The method of claim 1, further comprising the steps of:
    (a) transmitting and receiving a unique seed value from the first Ethernet interface to the second Ethernet Interface;
    (b) computing said first pseudo-random 1-bit data stream based on this unique seed value; and
    (c) computing said second pseudo-random 1-bit data stream based on this unique seed value.

7. An internet protocol (IP) pulse density modulation (PDM) audio transmitter apparatus adapted to transmit an encrypted PDM 1-bit data stream over an Ethernet network, said apparatus comprising:
    (a) an acoustic sensor element;
    (b) a sigma-delta modulator adapted to convert an analog input signal into a pulse density modulated 1-bit data stream at a predetermined audio oversampling rate;
    (c) a processor and memory adapted to compute and produce a first pseudo-random 1-bit data stream at a predetermined encoding rate;
    (d) a first exclusive-or (XOR) logic gate operatively connected to the pulse density modulated 1-bit data stream and the pseudo-random 1-bit data stream in such a manner as to produce an encrypted pulse density modulated 1-bit data stream at the predetermined audio oversampling rate;
    (e) a first first-in first-out (FIFO) memory configured to load the encrypted pulse density modulated 1-bit data stream at said predetermined audio oversampling rate and to unload Ethernet pulse density modulated frame data at a predetermined Ethernet physical layer (PHY) transfer rate; and
    (f) an Ethernet interface configured to accept the Ethernet frame data at the predetermined Ethernet PHY transfer rate and to transmit Ethernet data packets on a network.

8. The apparatus of claim 7, wherein:
    (a) said acoustic sensor element is a micro-electrical-mechanical system acoustic sensor element.

9. The apparatus of claim 7, wherein:
    (a) said predetermined audio oversampling rate is an integer multiple of the predetermined encoding rate.

10. The apparatus of claim 7, wherein the processor and memory are further adapted to:
    (a) compute a frame checksum (FCS);
    (b) compute a payload preamble; and
    (c) load each of said frame checksum and payload preamble into the FIFO memory.

11. The apparatus of claim 10, wherein the payload preamble includes a time stamp.

12. The apparatus of claim 7, wherein the processor and memory are further adapted to:
(a) store a predetermined frame checksum (FCS) delay gap;
(b) store a predetermined interframe gap;
(c) store a predetermined Ethernet frame prefix;
(d) store a predetermined internet protocol/user defined protocol (IP/UDP) prefix; and
(e) load each of said FCS delay gap, interframe gap, Ethernet frame prefix, and IP/UDP prefix into the FIFO memory.

13. An internet protocol (IP) speaker apparatus adapted to receive a 1-channel encrypted pulse density modulation (PDM) 1-bit data stream over an Ethernet network, said apparatus comprising:
(a) an Ethernet interface configured to receive Ethernet data packets on a network;
(b) a first-in first-out (FIFO) memory configured to load the Ethernet data packets at a predetermined Ethernet physical layer (PHY) transfer rate and to unload an encrypted pulse density modulated 1-bit data stream at a predetermined audio oversampling rate;
(c) a processor and memory adapted to compute and produce a pseudo-random 1-bit data stream at a predetermined encoding rate;
(d) an exclusive—or (XOR) logic gate operatively connected to the encrypted pulse density modulated 1-bit data stream and the pseudo-random 1-bit data stream in such a manner as to produce an unencrypted pulse density modulated 1-bit data stream at said predetermined audio oversampling rate;
(e) a decimator filter adapted to convert the unencrypted pulse density modulated 1-bit data stream into a pulse code modulated N-bit digital data stream at a predetermined audio sampling rate;
(f) a digital to analog converter adapted to convert the N-bit pulse code modulated digital data stream into an analog output signal a said predetermined audio sampling rate; and
(g) a loudspeaker configured to receive the analog output signal.

14. The apparatus of claim 13, wherein:
(a) the N-bit pulse code modulated digital data stream is a 16-bit pulse code modulated digital data stream.

15. The apparatus of claim 13, wherein:
(a) said predetermined audio oversampling rate is an integer multiple of the predetermined encoding rate.

16. An internet protocol (IP) loudspeaker apparatus adapted to receive a multi-channel encrypted pulse density modulation (PDM) 1-bit data stream over an Ethernet network, said apparatus comprising:
(a) a first-in first-out (FIFO) memory configured to load Ethernet data packets at a predetermined Ethernet physical layer (PHY) transfer rate and to unload a plurality of encrypted pulse density modulated 1-bit data streams at a predetermined audio oversampling rate;
(c) a processor and memory adapted to compute and produce a plurality of pseudo-random 1-bit data streams at a predetermined encoding rate;
(d) a plurality of exclusive-or (XOR) logic gates, each of said XOR gates operatively connected to a corresponding one of said plurality of encrypted pulse density modulated 1-bit data streams and a corresponding one of said plurality of pseudo-random 1-bit data streams in such a manner as to produce a corresponding plurality of unencrypted pulse density modulated 1-bit data streams at said predetermined audio oversampling rate;
(e) a plurality of decimator filters adapted to convert each of said plurality of unencrypted pulse density modulated 1-bit data streams into a corresponding plurality of N-bit pulse code modulated (PCM) digital data streams at a predetermined audio sampling rate;
(f) a digital audio mixer configured to accept the plurality of N-bit pulse code modulated digital data streams and to produce a combined pulse code modulated N-bit digital data stream multi-channel output;
(g) a digital to analog converter adapted to convert the combined PCM N-bit digital data stream into an analog output signal at said predetermined audio sampling rate; and
(h) a loudspeaker configured to receive the analog output signal.

17. The apparatus of claim 16, wherein:
(a) the combined PCM N-bit data stream is a PCM 16-bit digital data stream.

* * * * *